United States Patent
Suh et al.

(10) Patent No.: US 8,092,949 B2
(45) Date of Patent: Jan. 10, 2012

(54) FUEL CELL SYSTEM WITH FUEL CONVERSION REACTOR

(75) Inventors: Dong Myung Suh, Yongin-si (KR); Sang Jun Kong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1291 days.

(21) Appl. No.: 11/375,990

(22) Filed: Mar. 15, 2006

(65) Prior Publication Data

US 2006/0292408 A1     Dec. 28, 2006

(30) Foreign Application Priority Data

Jun. 24, 2005   (KR) .................. 10-2005-0055295

(51) Int. Cl.
*H01M 2/38* (2006.01)
(52) U.S. Cl. ......... 429/454; 429/513; 429/416; 429/444
(58) Field of Classification Search .................. 429/34, 429/38, 39, 19; 422/187, 188
See application file for complete search history.

(56) References Cited

U.S. PATENT DOCUMENTS

| | | | |
|---|---|---|---|
| 6,200,536 | B1 | 3/2001 | Tonkovich et al. |
| 2004/0047800 | A1 | 3/2004 | Sennoun et al. |
| 2004/0115496 | A1 | 6/2004 | Faye et al. |
| 2005/0008907 | A1* | 1/2005 | Isozaki et al. .......... 429/20 |
| 2005/0056412 | A1 | 3/2005 | Reinke et al. |
| 2005/0138864 | A1* | 6/2005 | Johnston et al. ......... 48/198.7 |

FOREIGN PATENT DOCUMENTS

| | | |
|---|---|---|
| DE | 10346880 A1 | 6/2005 |
| EP | 1 184 336 A1 | 3/2002 |
| EP | 1184336 A1 | 3/2002 |
| EP | 1 306 639 A | 5/2003 |
| EP | 1306639 A2 | 5/2003 |
| JP | 60-032255 | 2/1985 |
| JP | 2000-302407 | 10/2000 |
| JP | 2002-514296 | 5/2002 |
| JP | 2003-178784 | 6/2003 |
| JP | 2003-267702 | 9/2003 |
| JP | 2004-028521 | 1/2004 |
| JP | 2004-123478 | 4/2004 |
| JP | 2006-036562 | 9/2006 |
| JP | 2006-342017 | 12/2006 |
| KR | 1020040034026 A | 4/2004 |
| WO | WO 99/00186 | 1/1999 |

OTHER PUBLICATIONS

Examination Report issued on Feb. 5, 2009 in corresponding European patent application No. 06112459.0 in 4 pages.
Office Action dated Jun. 23, 2009 in related Japanese Patent Application No. 2006-162720.
Office Action dated Jun. 1, 2010 in related Japanese Patent Application No. 2006-162720.
The grant of related European Patent Application No. 06112459.0.

* cited by examiner

*Primary Examiner* — Raymond Alejandro
(74) *Attorney, Agent, or Firm* — Knobbe, Martens, Olson & Bear LLP

(57) ABSTRACT

Disclosed are a fuel reforming system and a fuel cell system having the same, which comprises a reformer to generate a reformed gas mainly containing hydrogen from a hydrogen containing fuel; and a CO remover to remove carbon monoxide from the reformed gas, wherein a ratio of an opening area of an inlet to an opening area of an outlet ranges from 1:1.5 to 1:3. Thus, the opening area of the inlet for the reforming fuel is larger than that of the outlet for the reformed gas, so that the reformed gas is smoothly discharged from the reformer without stagnating in the channel, thereby enhancing the reforming efficiency of the reformer.

12 Claims, 3 Drawing Sheets

FUEL CELL SYSTEM WITH FUEL CONVERSION REACTOR

CROSS-REFERENCE TO RELATED APPLICATIONS

This application claims the benefit of Korean Patent Application No. 2005-55295, filed on Jun. 24, 2005, in the Korean Intellectual Property Office, the disclosure of which is incorporated herein by reference in its entirety.

BACKGROUND

1. Field

The present invention relates to a fuel cell system, and more particularly, to a fuel reforming or converting system capable of enhancing the efficiency of fuel cell system.

2. Description of the Related Technology

The fuel cell system has been researched and developed as an alternative to secure a power source corresponding to an increased demand of power and to solve environmental problems. In general, a fuel cell system generates electric energy through an electrochemical reaction; for example, between $H_2$ and $O_2$. Usually, hydrogen gas is obtained from a hydrogen-containing fuel. The hydrogen-containing fuel includes an alcoholic fuel such as methanol, ethanol, etc.; a hydrocarbonaceous fuel such as methane, propane, butane, etc.; and a natural gas fuel such as liquefied natural gas, etc.

Based on fuel, catalyst, electrolyte and the like, the fuel cell system is classified into a phosphoric acid fuel cell (PAFC), a molten carbon fuel cell (MCFC), a solid oxide fuel cell (SOFC), a polymer electrolyte membrane fuel cell (PEMFC), an alkaline fuel cell (AFC), etc. However, these different types of fuel cells operate generally by the same principle. Further, the fuel cell system can be used in various fields including a mobile device, transportation, a distributed power source, etc.

The PEMFC uses hydrogen obtained by reforming or converting the fuel containing hydrogen atoms in order to generate electricity. Usually the PEMFC system has good output capability, operates at a low temperature, starts quickly, and has a short response time. Further, the PEMFC system has very wide applications and can be used in the mobile device such as a car; the distributed power source for a house or a public building; a small power source for a portable electronic device; and the like. A typical PEMFC system includes a fuel container storing fuel, a reformer or converter reforming or converting the fuel to hydrogen gas and a fuel cell stack generating electricity using the hydrogen gas.

SUMMARY OF CERTAIN INVENTIVE ASPECTS

One aspect of the invention provides a fuel cell system. The system comprises: a fuel conversion reactor comprising a channel providing a space for a fuel conversion reaction; at least one inlet of the fuel conversion reactor fluidly connected to the channel and configured to receive one or more reactants of the fuel conversion reaction; and at least one outlet of the fuel conversion reactor fluidly connected to the channel and configured to discharge resultants of the fuel conversion reaction. The channel has a cross-sectional size taken in a plane where the cross-sectional size is the smallest at a given point in the channel. The channel has at least one portion, in which the cross-sectional size varies along the channel.

In the foregoing fuel cell system, the cross-sectional size within the at least one portion may generally gradually increase along the channel in a direction toward the at least one outlet. The cross-sectional size within the at least one portion may increase generally in at least one step along the channel in a direction toward the at least one outlet. The channel may comprise at least one portion, in which the channel is branched into two or more sub-channels toward the at least one outlet. At least part of the two or more sub-channels may be united downstream toward the at least one outlet. The fuel conversion reactor may be configured in a plate shape, in which the channel is formed. The fuel cell system may further comprise fuel cells configured to generate electricity using at least one of the resultants.

Still in the foregoing fuel cell system, each inlet has a single opening having a size, and each outlet has a single opening having a size. The total size of the opening of the at least one outlet may be greater than the total size of the opening of the at least one inlet. If the at least one outlet comprises two or more outlets, the total size of the opening of the at least one outlet is the sum of the size of the openings of the two or more outlets. If the at least one inlet comprises two or more inlets, the total size of the opening of the at least one outlet is the sum of the size of the openings of the two or more inlets. A ratio of the total size of the opening of the at least one outlet to the total size of the opening of the at least one inlet may be from about 1.5 to about 3.

Another aspect of the invention provides a fuel cell system, which comprises: a fuel conversion reactor configured to convert reactants to resultants comprising hydrogen gas by one or more reactions of the reactants therein; at least one inlet of the fuel conversion reactor configured to receive the reactants supplied to the fuel conversion reactor at a supply rate (volume/time); and at least one outlet of the fuel conversion reactor configured to discharge the resultants from the fuel conversion reactor at a discharge rate (volume/time). In the fuel cell system, the at least one outlet and the at least one inlet are sized such that the discharge rate may be substantially greater than the supply rate.

In the foregoing system, each inlet has a single opening having a size, and each outlet has a single opening having a size, wherein the total size of the opening of the at least one outlet may be greater than the total size of the opening of the at least one inlet. If the at least one outlet comprises two or more outlets, the total size of the opening of the at least one outlet refers to the sum of the size of the openings of the two or more outlets. If the at least one inlet comprises two or more inlets, the total size of the opening of the at least one outlet refers to the sum of the size of the openings of the two or more inlets. A ratio of the total size of the opening of the at least one outlet to the total size of the opening of the at least one inlet may be from about 1.5 to about 3. A ratio of the total size of the opening of the at least one outlet to the total size of the opening of the at least one inlet is from 0.5 to about 7 times of the molar ratio of the resulting compounds to reacting compounds of the one or more reactions. The size of the opening of each inlet is measured in a plane perpendicular to a general direction of influx of the reactants through the inlet, and wherein the size of the opening of each outlet is measured in a plane perpendicular to a general direction of efflux of the resultants through the outlet. The discharge rate may be from about 1.5 to about 4 times greater than the supply rate.

Still in the foregoing system, the fuel conversion reactor may comprise a channel, which provides a space for the reaction and also provides a passage for at least one of the reactants and the resultants. The channel has a cross-sectional size taken in a plane where the cross-sectional size is the smallest at a given point in the channel, wherein the channel has at least one portion, in which the cross-sectional size may vary along the channel. The cross-sectional size within the at least one portion may generally gradually increase along the channel in a direction toward the at least one outlet. The cross-sectional size within the at least one portion may increase generally in at least one step along the channel in a direction toward the at least one outlet. The channel may comprise at least one portion, in which the channel may be branched into two or more sub-channels toward the at least one outlet. At least part of the two or more sub-channels may be united downstream toward the at least one outlet. The fuel conversion reactor may be configured in a plate shape, in which the channel may be formed. The fuel cell system may further comprise a fuel cell stack configured to generate electricity using the hydrogen gas. The fuel cell system may further comprise a CO remover connected to the outlet of the fuel conversion reactor and configured to remove at least part of CO existing in the resultants discharged from the outlet.

Another aspect of the invention provides a method of operating a fuel cell system. The method comprises providing a fuel cell system, which comprises a fuel conversion reactor comprising at least one inlet and at least one outlet; supplying reactants comprising fuel to the fuel conversion reactor at a supply rate (volume/time) via the at least one inlet; converting the reactants to resultants comprising hydrogen gas by one or more reactions of the reactants in the fuel conversion reactor; and discharging the resultants from the fuel conversion reactor at a discharge rate (volume/time) via the at least one outlet. In the method, the discharge rate is substantially greater than the supply rate. The method further comprises generating electricity utilizing the hydrogen discharged from the fuel conversion reactor.

In the foregoing method, each inlet has a single opening having a size, and each outlet has a single opening having a size. The total size of the opening of the at least one outlet may be greater than the total size of the opening of the at least one inlet. If the at least one outlet comprises two or more outlets, the total size of the opening of the at least one outlet is the sum of the size of the openings of the two or more outlets. If the at least one inlet comprises two or more inlets, the total size of the opening of the at least one outlet is the sum of the size of the openings of the two or more inlets. A ratio of the total size of the opening of the at least one outlet to the total size of the opening of the at least one inlet may be from about 1.5 to about 3. The size of the opening of each inlet is measured in a plane perpendicular to a general direction of influx of the reactants through the inlet, and wherein the size of the opening of each outlet is measured in a plane perpendicular to a general direction of efflux of the resultants through the outlet.

In the foregoing method, the fuel conversion reactor may comprise a channel, which provides a space for the reactions and also provides a passage for at least one of the reactants and the resultants. The channel has a cross-sectional size taken in a plane where the cross-sectional size is the smallest at a given point in the channel, wherein the channel has at least one portion, in which the cross-sectional size may vary along the channel. The cross-sectional size within the at least one portion may generally gradually increase along the channel in a direction toward the at least one outlet. The cross-sectional size within the at least one portion may increase generally in at least one step along the channel in a direction toward the at least one outlet. The channel may comprise at least one portion, in which the channel may be branched into two or more sub-channels toward the at least one outlet. At least part of the two or more sub-channels may be united downstream toward the at least one outlet. The fuel conversion reactor may be configured in a thin plate, in which the channel may be formed.

Still in the foregoing method, supplying the reactants and discharging the resultants may be carried out substantially continuously. Both the reactants and resultants may be in a gaseous phase within the fuel conversion reactor. The resultants may further comprise at least part of the reactants. The fuel cell system may further comprise a fuel cell, and wherein the method may further comprise generating electricity using the hydrogen gas. The resultants may further comprise CO, wherein the fuel cell system further comprising a CO remover to remove at least part of CO from the resultants. The discharge rate may be from about 1.7 to about 3.5 times greater than the supply rate.

One aspect of the present invention provides a fuel reforming or converting system and a fuel cell system having the same. In one embodiment, the fuel reforming system comprises: a reformer or converter to reform hydrogen-containing fuel and generate a reformed gas containing hydrogen gas. The reformer includes a channel, through which the hydrogen containing fuel flows and which has a cross-sectional area gradually or stepwise increasing along the channel from an inlet toward an outlet of the reformer. Further, the fuel reforming system may comprise a CO remover to remove CO existing in the gas discharged from the reformer. Also, the fuel reforming system may further comprise a heat source or heater to supply heat to the reformer and the CO remover. The CO remover may comprise a shift reaction unit to decrease concentration of carbon monoxide by a water gas shift reaction and a CO oxidation unit to remove CO by selectively oxidizing CO.

Another aspect of the present invention provides a fuel cell system comprising: the feeder to supply hydrogen containing fuel; a reformer to generate hydrogen by reforming a hydrogen containing fuel supplied from the feeder; and an electricity generator to generate electricity from electrochemical reaction between hydrogen gas and an oxidizing agent. The reformer comprises a reformer to generate reformed gas containing hydrogen gas from the hydrogen-containing fuel and a CO remover to remove carbon monoxide from the reformed gas. The reformer includes a channel, through which the hydrogen-containing fuel flows and which has a cross-section gradually or stepwise increasing along the channel from an inlet toward an outlet.

BRIEF DESCRIPTION OF THE DRAWINGS

The features and advantages of the invention will become apparent and more readily appreciated from the following description of embodiments, taken in conjunction with the accompanying drawings.

DETAILED DESCRIPTION OF EMBODIMENTS

Hereinafter, the term "hydrogen-containing fuel" refers to one or more chemical compounds containing hydrogen therein, including alcoholic fuel, hydrocarbonaceous fuel, natural gas fuel, etc. For example, alcoholic fuel includes methanol, ethanol, propanol, butanol, etc. For example, hydrocarbonaceous fuel includes methane, ethane, propane, butane, gasoline fuel, diesel fuel, biodisel fuel, corn oil, canola oil, etc. The hydrogen-containing fuel includes mixtures of two or more of the hydrogen-containing fuel.

Figure 1:
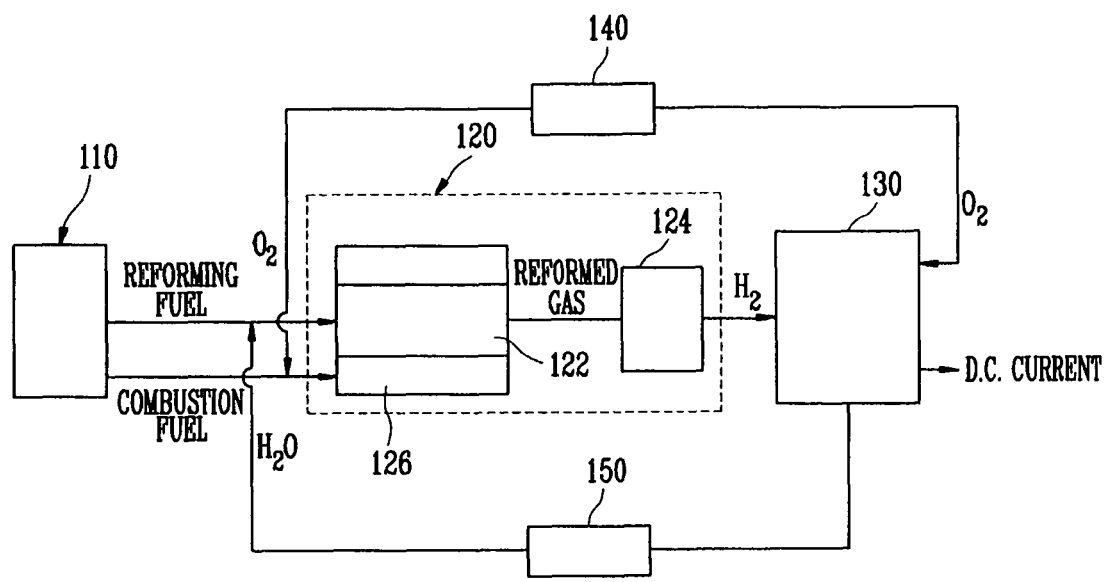
FIG. 1 is a block diagram of a fuel cell system according to an embodiment of the present invention.

Referring to FIG. 1, a fuel cell system includes a fuel feeder or container 110, a fuel converter or converter 120 and a fuel cell stack 130. The fuel feeder 110 stores hydrogen-containing fuel and supplies the fuel to the fuel converter 120. The fuel converter 120 converts the fuel in one or more chemical reactions to hydrogen gas (H2) and other chemicals. The fuel cell stack 130 receives the hydrogen gas from the fuel converter 120 and generates electricity by one or more electrochemical reactions between hydrogen gas and an oxidizing agent. In some embodiments, the oxidizing agent supplied to the stack 130 includes oxygen gas (O2) stored in a separate storage or air containing oxygen gas. In the illustrated embodiment, the oxidizing agent is supplied to the stack 130 through an air feeder 140.

In the illustrated embodiment, hydrogen-containing fuel is fed from the fuel feeder 110 to the fuel converter 120, more specifically into a fuel conversion reactor 122. The fuel feeder 110 further feeds some hydrogen-containing fuel to a heater 126 of the fuel converter 120. The fuel conversion reactor 122 converts the hydrogen-containing gas to hydrogen gas and others through one or more chemical reactions. The resulting gas from the reaction(s) is discharged from the fuel conversion reactor 122 and is optionally fed to a CO remover 124, which removes carbon monoxide contained in the resulting gas. The heater 126 provides heat energy to both the fuel conversion reactor 122 and the CO remover 124, for example, by burning the hydrogen-containing fuel fed from the fuel feeder 110.

Figure 2:
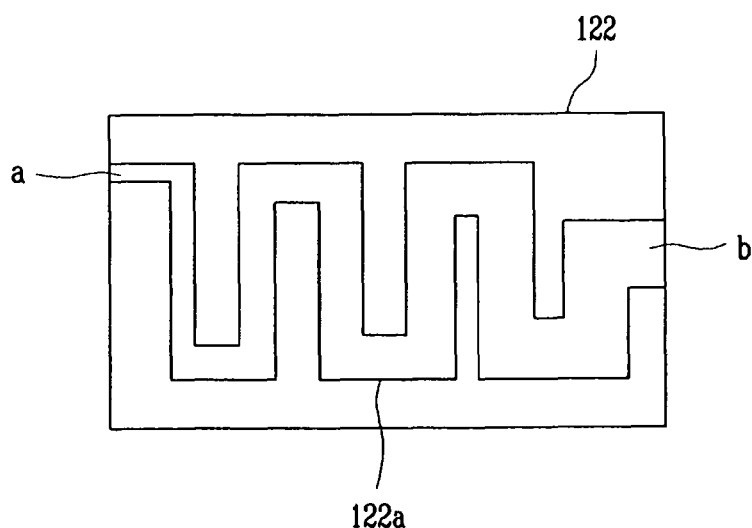
FIG. 2 is a schematic sectional view of a fuel conversion or reforming reactor according to an embodiment of the present invention.

Referring to the embodiment of FIG. 2, the fuel conversion reactor 122 includes a channel 122a, through which the hydrogen-containing fuel flows along with other compounds, which include those to react with the hydrogen-containing fuel and those formed by the reaction(s). In embodiments, the channel 122a is provided with one or more catalysts (not shown) formed thereon to facilitate the conversion reaction(s) for the hydrogen-containing fuel to convert to hydrogen gas.

The fuel conversion reactor 122 may convert the hydrogen-containing fuel using a number of different technologies, including a steam reforming (SR) method, an auto-thermal reforming (ATR) method, and a partial oxidation (POX) method to reform the hydrogen containing fuel, but not limited thereto. It is understood that the POX method and the ATR method are excellent in an initial start and a response characteristic in reply to load variation, and the SR method is excellent in efficiency of generating hydrogen.

In the SR method, hydrogen gas is obtained from an endothermic chemical reaction between the hydrogen-containing fuel and steam of water in the absence or presence of a catalyst. The SR method has been most widely used because the resulting gas of the fuel conversion reaction is stably supplied to the fuel cell stack 130 at a relative high concentration of hydrogen gas even though it requires a lot of energy to perform the endothermic reaction.

In embodiments where the fuel conversion reactor 122 employs the SR method, the hydrogen-containing fuel supplied to the conversion reactor 122 reacts with water (steam) in the presence of one or more catalysts and produce hydrogen gas. In the embodiments, one or more metals such as ruthenium, rhodium, nickel, etc. may be used as the catalyst for the conversion reaction(s), etc. In some embodiments, the metals may be supported by a carrier such as zirconium dioxide, alumina, silica gel, active alumina, titanium dioxide, zeolite, active carbon, etc.

The gas resulting from the conversion reaction(s) contains certain chemical entities other than hydrogen gas, which may include carbon dioxide ($CO_2$), methane ($CH_4$) and carbon monoxide (CO). The resulting gas then is supplied to fuel cell stack 130, in which the hydrogen gas participates in one or more electrochemical reactions to generate electricity. Certain components of the resulting gas or resultants may affect the catalytic activities of some materials used in the fuel cell stack. Particularly, carbon monoxide may poison a platinum catalyst generally used for an electrode of the stack 130 and deteriorate the performance of the fuel cell system. Thus, removing carbon monoxide may be needed before the resulting gas enters the fuel cell stack 130.

In some embodiments, to remove carbon monoxide, the CO remover 124 is provided between the conversion reactor 122 and the fuel cell stack 130 as illustrated in FIG. 1. The CO remover 124 may include a water gas shift unit (not shown,) in which a water-gas shift reaction is performed, and a selective oxidation unit (not shown,) in which a selective oxidation reaction is performed. The skilled artisan in this technical field will appreciate the water-gas shift reaction and the selective oxidation for removing CO from the resulting gas from the fuel conversion reactor 122. The water gas shift unit may include a catalyst (not shown) for the water-gas shift reaction, and the selective oxidation unit may include a catalyst (not shown) for the oxidation reaction. An oxidizer such as oxygen gas or air containing oxygen gas is supplied to the selective oxidation unit for the selective oxidizing reaction. In one embodiment, the oxidizer is supplied by the air feeder 140 to the selective oxidation unit.

In the illustrated embodiment, the fuel converter 120 includes the heater 126 to provide heat to the fuel conversion reaction(s) and/or CO removing reaction(s). The heater 126 generates heat energy by burning fuel. In the illustrated embodiment, the heater 126 burns the hydrogen-containing fuel supplied from the fuel feeder 110. The air feeder 140 also supplies the oxidizer to the heater 126. The heat energy generated in the heater 126 is supplied to the fuel conversion reactor 122 and the CO remover 124, thereby heating the fuel conversion reactor 122 and the CO remover 124. Heating of the fuel conversion reactor 122 and the CO remover 124 is controlled such that the heat is supplied until each reactor is heated to an appropriate temperature to carry out the intended reaction(s) therein, for example at least to a temperature at which the catalyst in the reactor is activated.

According to an embodiment of the invention, the fuel conversion reactor 122 is manufactured to have a plate shape, although not limited thereto. The plate-shape refers to a three-dimensional configuration, in which the length of the shape in one axis is substantially smaller than the lengths of the shape in the other two axes perpendicular to the one direction. In FIGS. 2-5, for example, the length of the plate-type reactor 122, 122', 122'', 122''' in the axis perpendicular to the surface of the drawing sheets is substantially smaller than the lengths of the reactor in the other two axes on the surface. As shown in FIG. 2, for example, the plate-type fuel conversion reactor 122 includes an inlet a, an outlet b and a channel 122a.

The fuel conversion reactor 122 receives the hydrogen-containing fuel and other compound(s) for the conversion reaction(s) through the inlet a. According to the illustrated embodiment, the hydrogen-containing fuel is to be fed to the inlet a by the fuel feeder 110. Also, gaseous water (steam) as the other reactant is to be fed to the inlet a by a water collection tank 150, which uses water generated from the electrochemical reaction(s) in the fuel cell stack 130. For the sake of convenience, the hydrogen-containing fuel and the other compounds for the fuel conversion reaction(s) are collectively referred to as "the reactants of the fuel conversion reaction."

The fuel conversion reactor 122 discharges hydrogen gas and other compounds resulting from the fuel conversion reaction(s) through the outlet b. According to the illustrated embodiment, the outlet b discharges the resultant to the optional CO remover 124. As will be further described in detail, it is notable that the opening size of the outlet b is larger than the opening size of the inlet a in the illustrated embodiment. The hydrogen gas and the other compounds that are discharged from the outlet b are collectively referred to as "the resultants of the fuel conversion reaction." It is notable that the resultants may include some of the reactants, including hydrogen-containing fuel, water, etc.

The channel 122a of the fuel conversion reactor 120 is located between and connecting the inlet a and outlet b. The channel 122a constitutes a reaction space for the fuel conversion reaction(s). Thus, the reactants supplied through the inlet a undergo one or more fuel conversion reactions in the channel 122a, while flowing through the channel, and the resultants of such reaction(s) are discharged through the outlet b. In embodiments, the reactants and resultants of the fuel conversion reaction(s) may be constantly flowing through the channel 122a, which provides a continuous reaction space. In some embodiments, the supply of the reactants and discharge of the resultants may be in a substantially steady flow state.

FIG. 2 illustrates an exemplary cross-sectional shape of the channel 122a formed in the plate-shaped body of the fuel conversion reactor 122. In the illustrated embodiment, although not limited thereto, the channel 122a forms a single passageway that changes directions a plurality of times with sharp-angled turns. Some portions of the channel 122a extend in parallel, although not limited thereto. In other embodiments, the channel 122a may have one or more passageways. In other embodiments, the channel 122a may be winding or waving. In other embodiments, the channel 122a may include rounded turns rather than the sharp-angled turns or in addition to certain sharp-angled turns.

In the SR method for the fuel conversion, for example, the hydrogen-containing fuel, e.g., methanol is subject to the following reaction to produce hydrogen gas.

$$CH_3OH(g)+H_2O(g) \leftrightarrows CO_2+3H_2$$

This reaction is reversible and generates 3 moles of hydrogen gas ($3H_2$) per 1 mole of methanol ($CH_3OH$). In an ideal gas situation, the number of moles of gas is proportional to the volume of the gas at a given temperature, and also proportional to the temperature of the gas. Although not perfect and with certain adjustments, these rules generally apply to most real gas situations including the foregoing reaction.

Thus, the total volume of gas increases as the reaction continues or as the reaction mixture moves toward the outlet b when the temperature remains about the same. Also, the total volume of the gas will increase if the temperature increases during the reaction. The increase of the volume may elevate the pressure within the channel 122a if the size of the passageway of the channel 122a is constant throughout or does not increase corresponding to the increase of the volume. In the foregoing reaction, if the pressure increases within the channel 122, the reaction may not proceed well to the production of hydrogen gas or may proceed in the reverse direction, which may decrease the production of hydrogen gas.

For example, Table 1 below summarizes experiments using the fuel conversion reactor 120 as illustrated in FIGS. 1 and 2. In the experiments, methanol about room temperature (300K) was used as the hydrogen-containing fuel as in the above chemical reaction equation. During the reaction, the channel 122a is heated by the heat energy supplied from the heater 126 so that the gas passing through the channel 122a at a temperature higher than room temperature. Table 1 shows, for example, two results of the experiments, in which the gas passing through the channel 122a were at 820K and 1058K.

TABLE 1

| Material | Supply rate of reactants (cc/sec at 300K) | Discharge rate of resultants(cc/sec) | |
|---|---|---|---|
| | | At 820K | At 1058K |
| MEOH | 1399.72 | 1806.63 | 3301.10 |
| $O_2$ | 0.00 | 0.00 | 0.00 |
| $CO_2$ | 0.00 | 1303.02 | 1603.06 |
| $H_2O$ | 1400.28 | 1807.87 | 3303.08 |
| $H_2$ | 0.00 | 3939.37 | 4833.76 |
| $N_2$ | 0.00 | 0.00 | 0.00 |
| Sum | 2800.00 | 8856.90 | 13041.00 |

Referring to Table 1, while the total supply rate of the influx of the reactants to the fuel conversion reactor 122 was 2800 cc/sec, the total discharge rate of the resultants from the reactor 122 was 8856.90 cc/sec at 820K and of 13041.00 cc/sec at 1058K. This shows that the more resulting gas can be obtained at a higher temperature. However, if the inlet a and the outlet b are of or about the same size, the efflux of the resulting gas discharged from the fuel conversion reaction 122 would be limited because the volume increase of the gas in the channel 122a would stagnate in the channel 122a. This would increase the pressure within the channel 122a, which may reverse the fuel conversion reaction and deteriorate the efficiency of the fuel conversion reactor 122.

Although not illustrated, in embodiments, the channel 122a is configured such that the cross-section of the passageway taken along a plain perpendicular to the direction of the flow at a given point in the channel 122a is generally circular. The cross-sectional shape may be different from a circle at locations where the channel 122a turns directions. In other embodiments, the cross-section of the passageway taken along a plain perpendicular to the direction of the flow at a given point in the channel 122a may be generally oval, simply rounded, square, rectangular, trapezoidal, polygonal, etc. In some embodiments, the cross-sectional shape of the passageway may vary along the channel 122a.

However, regardless of the shape of the cross-section, in embodiments of the invention, the size of the cross-section of the passageway varies along the channel 122a. In some embodiments, the size of the cross-section varies throughout the passageway of the channel 122a from the inlet a to the outlet b. In other embodiment, the size of the cross-section varies only one or more portions of the passageway of the channel 122a. In some embodiments, the size of the cross-section may increase along the channel 122a in a direction of the flow toward the outlet b. The size of the cross-section may increase throughout the passageway or one or more portions of the channel 122a. In some embodiments, the channel 122 may have one or more portions where the size of their cross-sections may decrease along the channel 122a in a direction of the flow toward the outlet b. In embodiments, in the portion where the size of the cross-section varies, the size may vary gradually or stepwise or in any other ways. According to an embodiment of the present invention, the cross-section of the channel 122a is gradually or stepwise increased from the inlet a to the outlet b.

In embodiments, as noted above, the size of the opening area of the outlet b differs from the size of the opening area of the inlet a. In some embodiments, the opening area of the outlet b is greater than the opening area of the inlet a. In some embodiment, the sizes of the opening areas of the inlet a and the outlet b are designed such that the discharge rate of the total reactants supplied at the outlet b is substantially greater than the supply rate of the total resultants discharged at the inlet a. In some embodiments, for example, the discharge rate is greater than the supply rate by about 20, 30, 40, 50, 60, 70, 80, 90, 100, 120, 140, 160, 180, 200 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860,880, 9001, 920, 940, 960, 980 or 1000% of the supply rate. In some embodiments using the SR method, for example, the supply rate of the reactants is from about 300 to about 7000 cc/sec, optionally from about 1000 to about 5000 cc/sec, still optionally from about 2000 to about 4000 cc/sec, further optionally from about 2500 to about 3500 cc/sec.

In some embodiment, the sizes of the opening areas of the inlet a and the outlet b are designed such that the size ratio of the total opening area of the outlet b to the total opening area of the inlet a (hereinafter "size ratio of the outlet to inlet") is a function of the molar ratio of the resulting compounds to the reacting compounds of the reaction(s) carried out in the channel 122a (hereinafter "molar ratio of the resulting to reacting compounds"). Here, the resulting compounds refer to those created from the reaction and do not include the reactants that do not participate in the reaction(s) and discharged at the outlet b. Thus, for example, in the foregoing reaction used in the SR method, the resulting compounds are $CO_2$ and $3H_2$, and the reacting compounds are $CH_3OH(g)$ and $H_2O(g)$. The molar ratio of the resulting compounds to the reacting compounds in the foregoing formula is 2. In embodiments, the size ratio of the outlet to inlet is from about 0.5 to about 10 times of the molar ratio of the resulting to reacting compounds. In some embodiments, for example, the size ratio of the outlet to inlet is about 0.5, 0.6, 0.7, 0.8, 0.9, 1, 1.1, 1.2, 1.3, 1.4, 1.5, 1.6, 1.7, 1.8, 1.9, 2, 2.2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6, 9.8 or 10 times of the molar ratio of the resulting to reacting compounds.

In certain embodiments, the ratio of the opening area of the outlet b to that of the inlet a is from about 1.5 to about 5, optionally from about 1.5 to about 3. By having the ratio of about 1.5 or more, i.e., the size of the outlet opening is at least about 1.5 times greater than the inlet opening, the discharge of the resultants may be facilitated, which can reduce the possibility of building pressure within the channel 122a. By having the ratio of about 5 or less, it may prevent unwanted discharge non-reacted reactants that may happen if the discharge is overfacilitated.

Again referring to FIG. 2, the outlet b of the fuel conversion reactor 122 has an opening larger than that of the inlet a. Further, the cross-section of passageway of the channel 122a is gradually increased in a flow direction toward the outlet b.

Figure 3:
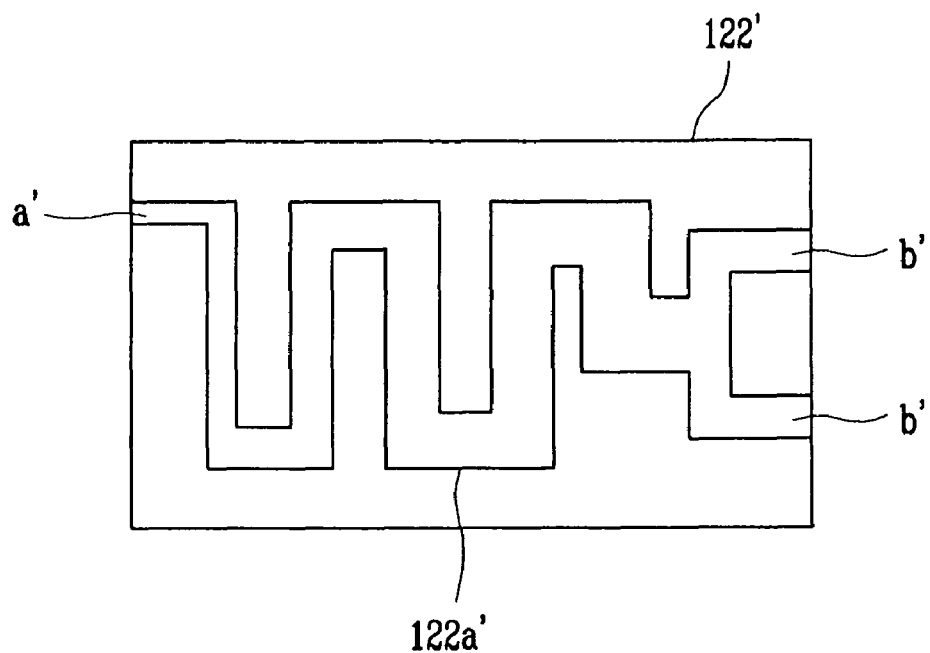
FIG. 3 is a schematic sectional view of a fuel conversion reactor according to another embodiment of the present invention.

According to another embodiment of the present invention, as shown in FIG. 3, a fuel conversion reactor 122' includes an inlet a', two outlets b' and a channel 122'. Each outlet b' has an opening area, the size of which is similar to or larger than that of the inlet a'. The channel 122a' connects the inlet a' and the outlets b'. The channel 122a' is branched into two passageways to connect to the outlets b'. Also, FIG. 3 shows that the cross-sectional size of the channel 122a' varies in some portions (before branching) thereof and does not vary in other portions (after branching). Although FIG. 3 shows only two outlets b', the number of outlets b' is not limited to two. Similarly, in other embodiments, the fuel conversion reactor may include more than one inlet.

Figure 4:
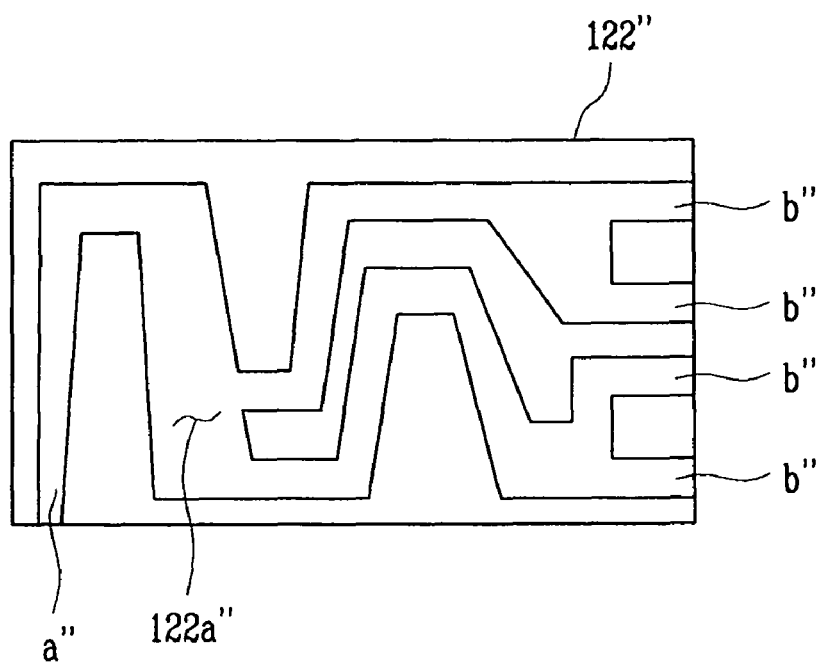
FIG. 4 is a schematic sectional view of a fuel conversion reactor according to another embodiment of the present invention.

According to another embodiment of the present invention, as shown in FIG. 4, a fuel conversion reactor 122" includes a channel 122a" between an inlet a" and four outlets b". In the illustrated embodiment, the channel 122a" is branched into two passageways or sub-channels, each of which is further branched into two passageways connecting to the four outlets b". In some embodiments, the channel 122a" may be branched into two or more passageways, one or more of which may be further branched into two or more sub-passageways in cascade.

Figure 5:
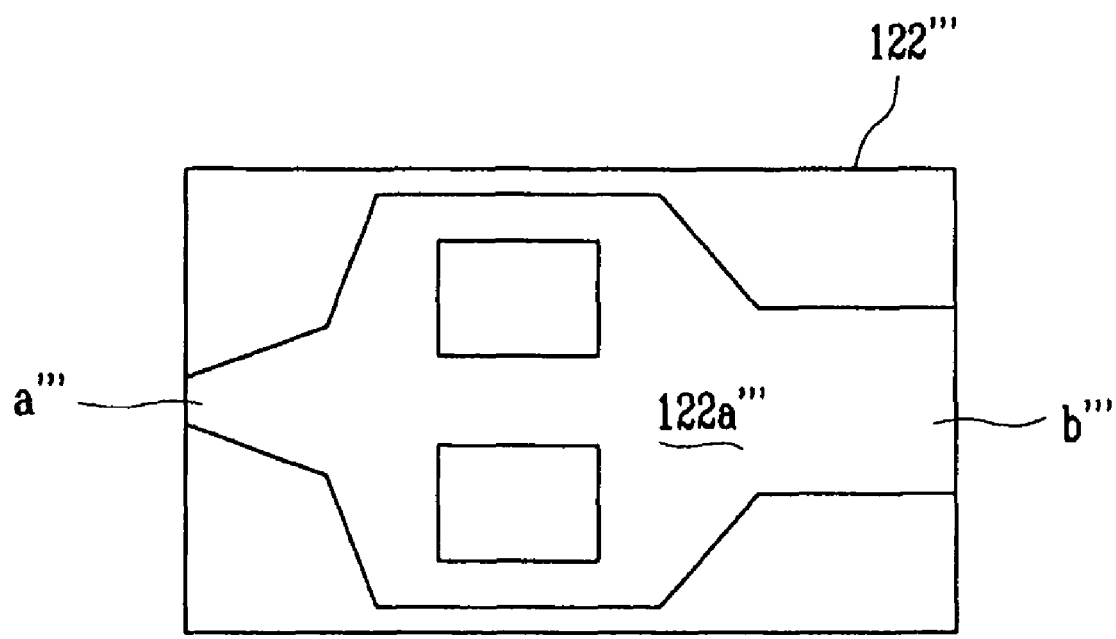
FIG. 5 is a schematic sectional view of a fuel conversion reactor according to another embodiment of the present invention.

According to another embodiment of the present invention, as shown in FIG. 5, a fuel conversion reactor 122'" includes a channel 122a'" between an inlet a'" and an outlet b'". The channel 122'" is divided into a plurality of sub-channels in the middle thereof. Then, in the downstream, the sub-channels are united into one main channel, which is connected to the outlet b'". The opening size of outlet b'" may be larger than that of the inlet a'".

Below, referring to FIGS. 1 and 2, the operation of the fuel cell system with the fuel converter will be described. First, the hydrogen-containing fuel is supplied from the fuel feeder 110 to and burned in the heater 126. The heat generated by the heater 126 is transferred to the fuel conversion reactor 122 and the CO remover 124. The fuel conversion reactor 122 and the CO remover 124 are heated to a temperature for their respective reactions. On the other hand, the reactants for the fuel conversion reaction(s) including the hydrogen-containing fuel are supplied to the fuel conversion reactor 122. In the case of the SR method, water is supplied to the fuel conversion reactor as a reactant too.

The reactants are introduced into the channel 122a through the inlet a and subject to the fuel conversion reaction(s) while passing through the channel 122a. Then, the resultants including hydrogen gas and other chemical entities are discharged from the fuel conversion reactor 122 through the outlet b. The discharged resultants are then supplied to the CO remover 124. In embodiments of the invention, various configurations and sizes of the cross-section of the channel 122a, 122a', 122a" or 122a'", the inlet a, a', a" or a'" and the outlet b, b', b" or b'" can improve the performance of the fuel conversion reactor 120.

In the illustrated embodiments, the channel 122a, 122a', 122a" or 122a'" has a structure to prevent from building the internal pressure or to reduce such internal pressure so that the fuel conversion reaction is smoothly forwarded, thereby enhancing the efficiency of the fuel conversion.

When the gas discharged from the fuel conversion reactor 120 is introduced into the CO remover 124, carbon monoxide contained in the gas is primarily removed by the water gas shift unit. Then, carbon monoxide remaining in the discharged gas is oxidized in the selective oxidation unit, and thus secondarily removed. Therefore, the gas discharged from the CO remover 124 contains very little carbon monoxide, e.g., less than about 10 ppm.

The gas supplied to the fuel cell stack 130 includes a lot of hydrogen gas and little carbon monoxide. The hydrogen gas is introduced into an anode electrode (not shown) of the fuel cell stack 130, and the oxygen gas is supplied to a cathode electrode (not shown) of the fuel cell stack 130 by the air feeder 140. In an electrochemical oxidation reaction, the hydrogen gas is broken into electrons and protons ($H^+$). As the protons are transferred through a membrane (not shown) interposed between the anode electrode and the cathode electrode in the stack 130, the electrons flow, by which electricity is generated. The protons react with oxygen gas to product water, which is collected in the collection tank 150 and then recycled.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A fuel cell system, comprising:
a fuel conversion reactor formed in a plate shape and comprising a channel providing a space for a fuel conversion reaction;
an inlet of the fuel conversion reactor fluidly connected to the channel and configured to receive one or more reactants of the fuel conversion reaction; and
an outlet of the fuel conversion reactor fluidly connected to the channel and configured to discharge resultants of the fuel conversion reaction, wherein the channel has a cross-sectional size taken in a plane where the cross-sectional size is the smallest at a first portion of the channel, wherein the channel has a second portion, in which the cross-sectional size varies along the channel, wherein the channel is branched into two or more sub-channels that terminate at the outlet, and wherein a ratio of a sum of opening cross-sectional sizes of sub-channels at the outlet to a cross-sectional size of an inlet opening is between about 1.5 and about 3, and wherein the fuel cell system further comprises fuel cells configured to generate electricity using at least one of the resultants.

2. The system of claim 1, wherein the cross-sectional size within the second portion generally gradually increases along the channel in a direction toward the outlet.

3. The system of claim 1, wherein the cross-sectional size within the second portion increases generally in at least one step along the channel in a direction toward the outlet.

4. The system of claim 1, wherein the inlet opening comprises a plurality of inlet openings.

5. A fuel cell system, comprising:
a fuel conversion reactor configured to convert reactants to resultants comprising hydrogen gas by one or more reactions of the reactants therein, wherein the fuel conversion reactor comprises a plate shape in which a channel is formed providing space for the reaction and a passage for at least one of the reactants and the resultants, wherein the channel is branched into two or more sub-channels, and wherein a ratio of a sum of opening cross-sectional sizes of the sub-channels at an outlet opening to a cross-sectional size of an inlet opening is between about 1.5 and about 3;
an inlet of the fuel conversion reactor configured to receive the reactants supplied to the fuel conversion reactor at a supply rate; and
an outlet of the fuel conversion reactor configured to discharge the resultants from the fuel conversion reactor at a discharge rate, wherein the outlet and the inlet are sized such that the discharge rate is substantially greater than the supply rate, further comprising a fuel cell stack configured to generate electricity using the hydrogen gas, and wherein the channel has a first portion with a cross-sectional size and a second portion with a cross-sectional size, wherein the first portion comprises the smallest cross-sectional size of the channel, and wherein the second portion comprises a variable cross-sectional size of the channel.

6. The system of claim 5, wherein the inlet opening comprises a plurality of inlet openings.

7. The system of claim 5, wherein a molar ratio of resulting compounds to reacting compounds is from about 0.5 to about 7.

8. The system of claim 5, wherein the size of the inlet opening is measured in a plane perpendicular to the general direction of influx of reactants through the inlet, and wherein the size of the sub-channel outlet openings is measured in a plane perpendicular to the general direction of efflux of resultants through the outlet.

9. The system of claim 5, wherein the outlet and the inlet are sized such that the discharge rate is from about 1.5 to about 4 times greater than the supply rate.

10. The system of claim 5, wherein the variable cross-sectional size generally gradually increases along the channel toward the outlet.

11. The system of claim 5, wherein the variable cross-sectional size increases generally in at least one step along the channel toward the outlet.

12. The system of claim 5 further comprising a CO remover connected to the outlet of the fuel conversion reactor and configured to remove at least part of CO existing in the resultants discharged from the outlet.

* * * * *